Jan. 8, 1957 W. C. BRUCKMAN 2,776,557

CONTROL SYSTEM

Filed Nov. 9, 1953 6 Sheets-Sheet 1

INVENTOR
WILLIAM C. BRUCKMAN
BY Toulmin & Toulmin
ATTORNEY

Jan. 8, 1957 W. C. BRUCKMAN 2,776,557

CONTROL SYSTEM

Filed Nov. 9, 1953

6 Sheets-Sheet 2

INVENTOR.
WILLIAM C. BRUCKMAN
BY Toulmin & Toulmin
ATTORNEYS

Jan. 8, 1957 W. C. BRUCKMAN 2,776,557

CONTROL SYSTEM

Filed Nov. 9, 1953 6 Sheets-Sheet 3

INVENTOR.
WILLIAM C. BRUCKMAN
BY Toulmin & Toulmin
ATTORNEYS

Jan. 8, 1957 W. C. BRUCKMAN 2,776,557

CONTROL SYSTEM

Filed Nov. 9, 1953 6 Sheets-Sheet 4

INVENTOR.

BY WILLIAM C. BRUCKMAN

Toulmin & Toulmin

ATTORNEYS

Jan. 8, 1957 W. C. BRUCKMAN 2,776,557

CONTROL SYSTEM

Filed Nov. 9, 1953. 6 Sheets-Sheet 5

INVENTOR.

WILLIAM C. BRUCKMAN

BY Toulmin & Toulmin

ATTORNEYS

INVENTOR.
WILLIAM C. BRUCKMAN
BY Toulmin & Toulmin
ATTORNEYS

9104

United States Patent Office 2,776,557 Patented Jan. 8, 1957

2,776,557

CONTROL SYSTEM

William C. Bruckman, Newton, Iowa, assignor, by mesne assignments, to The Easy Washing Machine Company, Limited, Toronto, Ontario, Canada, a corporation Application November 9, 1953, Serial No. 391,036

14 Claims. (Cl. 68—12)

This invention relates to washing machines and like apparatus, and particularly to automatic washing machines of the type which automatically go through a washing cycle and a spin dry cycle, and to control means therefor.

In my co-pending applications, Serial No. 376,643 filed August 26, 1953, and Serial No. 377,153 filed August 28, 1953, I disclose in considerable detail an automatic washing machine in which there is a clothes receiving tub rotatably mounted within the frame of the machine and within which tub there is an agitator. During a washing cycle the tub is stationary while the agitator is oscillated, and during a spin dry cycle the tub and agitator are locked together and both rotate at relatively high speed thereby centrifuging water from the tub and the clothes therein and effecting a damp drying of the clothes.

In the operation of the washing machine the tub is automatically filled with water prior to a washing operation, is then again filled with water for rinsing operations after the washing operation is completed and before the final spin drying operation, a spray of water is supplied to the tub for skimming off suds and other floating material from the top of the water within the tub.

The present invention is particularly concerned with a control system for controlling the cycle of operations of an automatic washer of the nature referred to above.

A particular object of this invention is the provision of a single timer control for directly initiating a series of operations of the washing machine, for timing each operation, and for halting the machine at the conclusion of a series of operations without the necessity of remote switches and relays found in the prior art.

Another particular object is the provision of a simple control arrangement for controlling the entire cycle of an automatic washing machine of the nature referred to solely from a timer unit.

A further object of this invention is the provision of a single timer unit for controlling the operation of a washing machine of the nature referred to, including a safety interlock operable on the timer unit to halt the machine in case of faulty operation.

A more specific object is the provision of a control arrangement for a washing machine of the nature referred to, including a single motor driven timer mechanism, by means of which the entire cycle of operations of the machine can be controlled, eliminating all relays, solenoids (except from the water valves), float switches, limit switches, secondary timers, and other elements contributing to initial cost and to servicing, while retaining full flexibility and completely automatic operation.

In the washing machine referred to an automatic counterbalancing of the rotating tub structure is effected by permitting the tub structure to tilt within the frame of the machine and utilizing the tilting of the tub structure to distribute a body of counterbalancing fluid about the tub structure to offset unbalanced loads therein. With this in mind, a still further object of this invention is the provision of a control element associated with the timer unit or mechanism outlined above for interrupting operation of the washing machine in the event the tilting of the tub structure exceeds an allowable limit.

These and other objects and advantages of this invention will become more apparent upon reference to the following specification taken in connection with the accompanying drawings, wherein.

Figure 1:
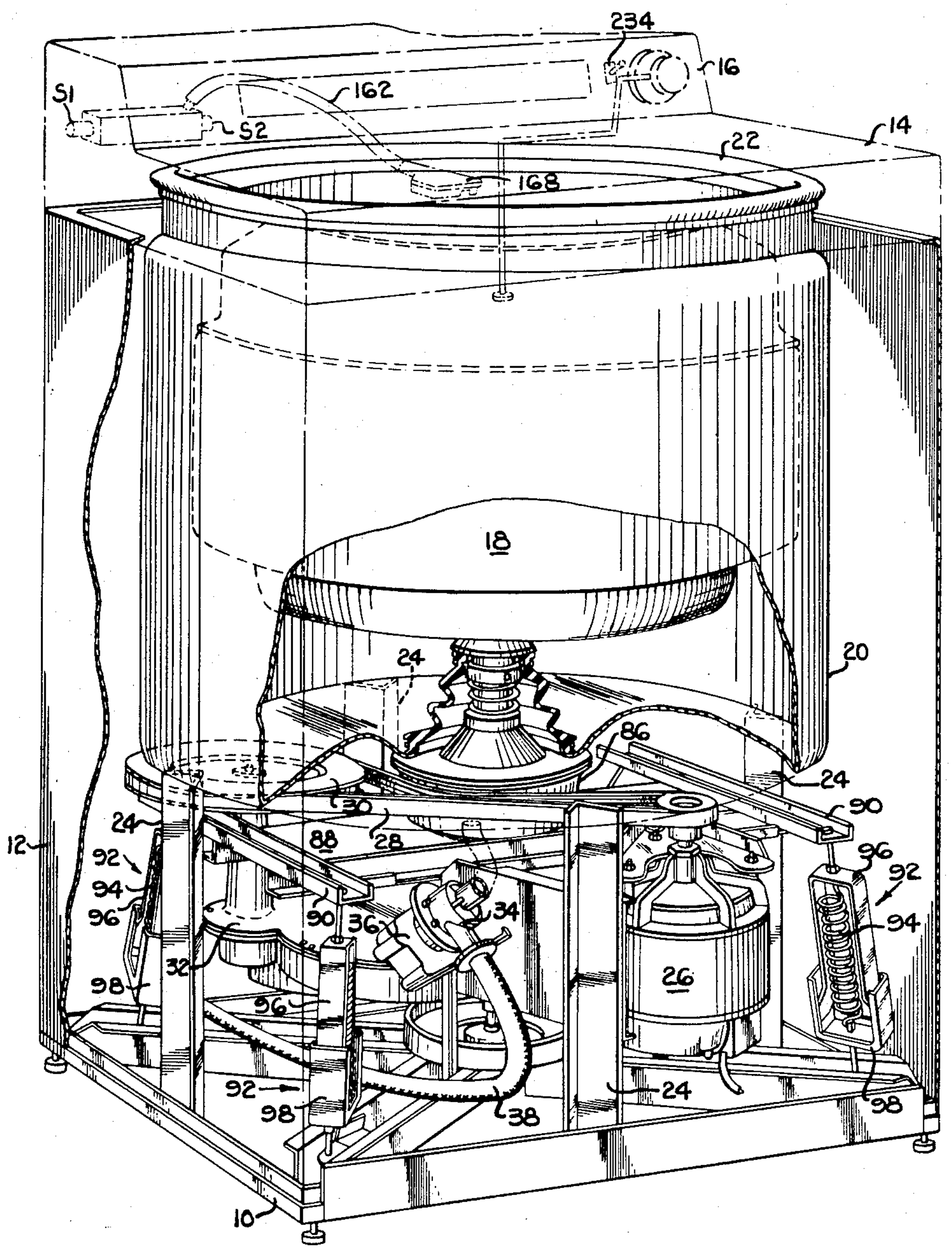
Figure 1 is a perspective view of a washing machine constructed according to my invention with the outer frame and a portion of the machine inside the frame broken away to show the construction thereof.

Referring to the drawings somewhat more in detail, in Figure 1 it will be observed that the machine comprises a base portion 10 on which is mounted the surrounding cabinet 12 of the machine, and which cabinet comprises an upper portion 14 having a control panel 16 upstanding from the rear portion thereof. Upper portion 14 of the cabinet is centrally apertured for gaining access to the interior of the rotatable tub structure 18 in which the clothes to be washed are placed.

Surrounding tub structure 18 is a sump 20 closed at the bottom and sealingly engaging the underside of top portion 14 of the cabinet as by the rubberlike sealing ring 22.

Sump 20 is supported on the uprights 24 upstanding from base 10, as illustrated.

An electric motor 26 within the frame of the machine drives a V belt 28 which passes around the pulley 30 that drives into a transmission generally indicated at 32, and which transmission is adapted for driving the agitator which is located within the tub structure 18.

Also located within the frame of the machine is a sump pump 34 having an individual electric drive motor 36. Sump pump 34 has its suction side connected with sump 20 and is attached to discharge through flexible hose 38 to a drain or to a container from which the water can be withdrawn and returned to the tub for re-use.

Figure 2:
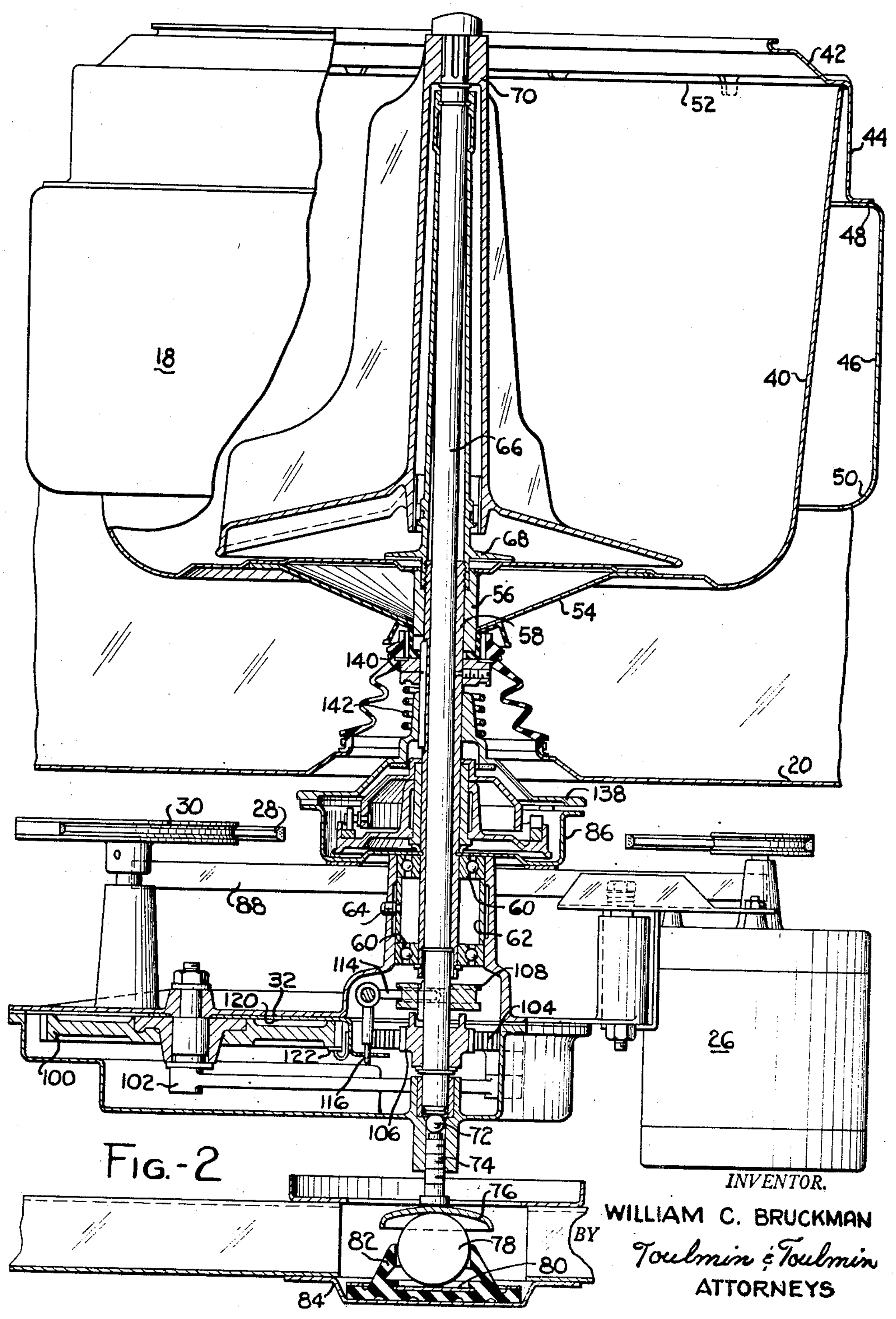
Figure 2 is a vertical transverse section of the tub structure, the drive mechanism therefor, and the support for the tub structure.

Turning now to Figure 2, it will be noted that the tub structure 18 consists of an inner imperforate clothes receiving tub 40 tapering upwardly and outwardly from the bottom and having mounted on top thereof a crown ring 42. Crown ring 42 comprises a dependent portion 44 which is attached to the top of a balancing ring 46 having inturned upper and lower parts 48 and 50 respectively.

The crown ring 42 rests on the upper edge of tub 40 in such a manner that spaces 52 are provided therebetween and through which spaces water will pass when the tub is rotated into balancing ring 46 and therethrough into sump 20, with a portion of the water being retained within the balancing ring when the tub structure is rotating.

The bottom wall of tub 40 carries an inverted conical member 54 and a hub 56 rigidly connected with the bottom wall of tub 40 and with conical member 54. Hub 56 is supported on a drive sleeve 58 that extends downwardly into transmission 32 and is supported therein on the spaced antifriction bearings 60 which are maintained in spaced relation by a sleeve 62 that is locked in place by set screw 64. Rings on sleeve 58 above the uppermost bearings 60 and below the lowermost bearings 60 provide means for locating sleeve 58 in the direction of its axis.

The sleeve 58 rotatably receives the agitator drive shaft 66 which extends upwardly into the tub through a column 68 that is threaded the upper end of sleeve 58. Column 68 is provided with a radially extending circumferential flange engaging the upper surface of the tub bottom, and extends to above the water level in tub 40. Above the upper end of column 68 shaft 66 is splined to agitator 70.

Shaft 66 extends downwardly into transmission 32, and at its lower end rests on a ball 72 which is supported by a screw 74 which extends vertically dowwardly below transmission 32.

At its lower end screw 74 has welded thereto a downwardly concave cup 76 that rests on top of a large metal ball 78 that rests on a metal plate 80 in the bottom of a rubberlike ball retainer 82. Ball retainer 82 is supported on a platform 84 rigid with the base of the frame of the machine. The described arrangement provides for the support of the transmission, the tub structure and the agitator within the frame of the machine while, at the same time, the entire assembly is tiltable about ball 78.

Referring again to Figure 1 taken in connection with Figure 2, the transmission 32 has rigidly supported thereon a sheet metal housing member 86, and on the bottom of housing member 86 there is rigidly attached a platform 88 extending transversely of the frame of the machine. At its opposite ends platform 88 carries the channels 90, and at each end of each of the channels there is connected the upper end of a resilient snubber assembly 92, the lower end of which is secured to the base of the frame of the machine. The snubber assemblies 92 include spring means 94 which continuously urge the tiltable assembly within the frame of the machine toward a vertical position. The snubber assemblies also comprise the relatively movable leg portions 96 and 98 having friction means therebetween so that a predetermined tilting force must be exerted on the tiltable assembly before it will tilt within the frame of the machine.

Figure 3:
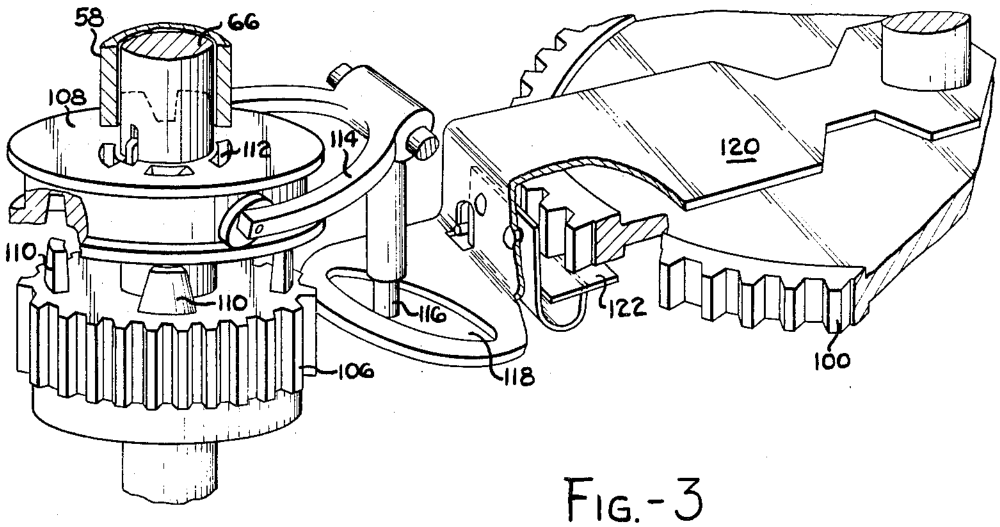
Figure 3 is a perspective view showing a portion of the drive for the tub and agitator and the clutch mechanism which connects the agitator to the drive for oscillation thereof or connects the agitator with the tub structure for rotation of the agitator and tub structure as a unit.
Figures 4, 5:
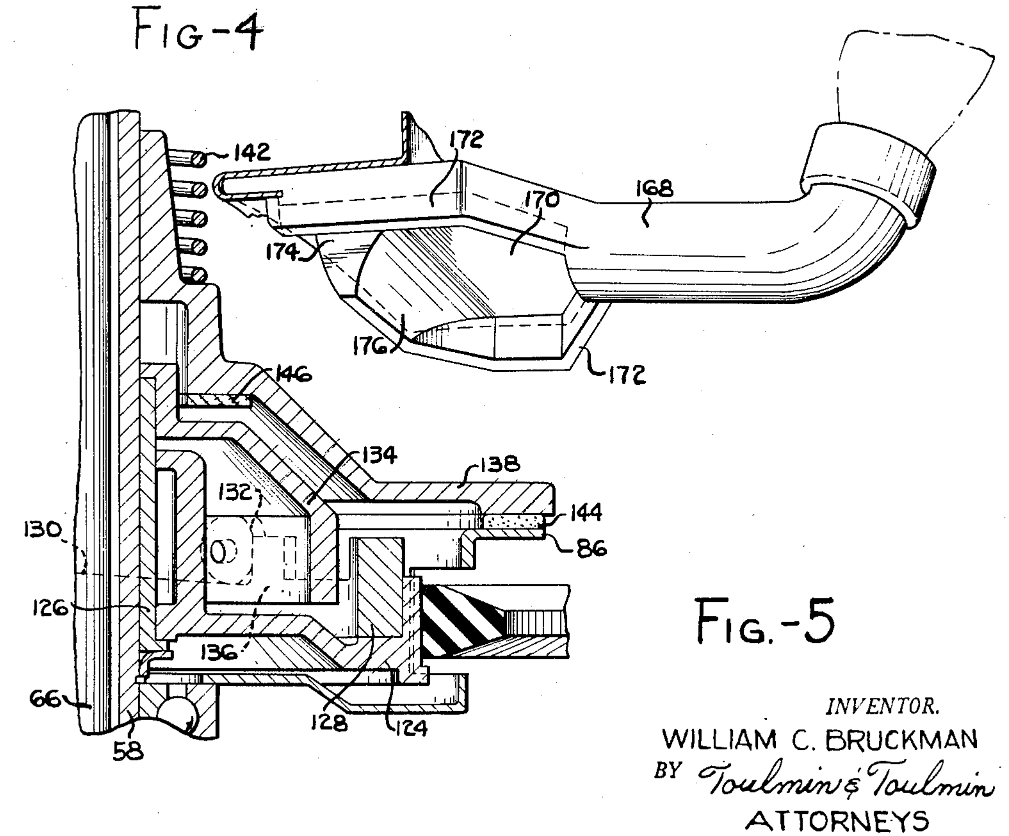
Figure 4 is a fragmentary sectional view showing the drive for the tub structure and a brake thereof, by means of which the tub structure is either held stationary or is driven in rotation.
Figure 5 is a fragmentary perspective view showing a spray nozzle associated with the tub, by means of which a spray of water is supplied to the tub at the beginning of a rinse operation.

Turning again to Figure 2, this figure together with Figures 3 and 4, will reveal the drive mechanism for driving the tub and the agitator.

As to the agitator drive, pulley 30, which is driven by belt 28, drives the shaft on which it is fixed. A pinion fixed on the other end of this shaft meshes with and drives a drive gear 100 that is connected by a link 102 for oscillating a gear sector 104 that meshes with a pinion 106 rotatably mounted on agitator shaft 66. For connecting pinion 106 with agitator shaft 66 there is keyed to the agitator shaft a clutch member 108 which can be moved downwardly into driving engagement with pinion 106, thereby to drivingly connect agitator shaft 66 with oscillating pinion 104.

Clutch member 108 is also movable upwardly to clutch shaft 66 to the lower end of drive sleeve 58 for locking the agitator shaft to the tub structure.

As will be seen in Figure 3, both the lower end of drive sleeve 58 and the upper face of pinion 106 are provided with teeth 110 adapted for engaging drive recesses 112 in clutch member 108 for effecting the driving connections referred to.

Clutch member 108 is adapted for being moved between its two operative positions by a shifting fork 114 pivoted within the transmission and engaging the clutch member and having a finger 116 disposed within a diagonal slot 118 on the end of an arm 120 which extends across the face of gear 100. Arm 120 includes a friction pad 122 spring urged toward one side face of gear 100 at the periphery thereof so that the gear frictionally engages the arm 120. It will be apparent that in one direction of rotation of gear 100 clutch member 108 will be engaged with oscillating pinion 106 thereby to bring about oscillation of the agitator within the tub structure; whereas, in the opposite direction of rotation of gear 100, clutch member 108 will be shifted into engagement with the lower end of drive sleeve 58 thereby to lock the agitator to the tub structure.

Referring now to Figures 2 and 4, the drive for the tub structure is located within the housing member 86 that is secured to the top of transmission 32. Within housing member 86 there is a drive ring 124 rotatable about a bushing 126 which is, in turn, rotatable about drive sleeve 58. Drive ring 124 carries a cam ring 128 having cam rises thereon as indicated at 130. The cam rises support rollers 132 that are carried on a drive member 134 which is also rotatable about bushing 126. Abutments at opposite ends of cam rises 130, one of which is indicated at 136 in Figure 4, predetermines the end portions of rollers 132 along the cam rises. When the rollers 132 are at the bottom of the cam rises, as indicated in Figure 4, a clutch and brake member 138 that is keyed to drive sleeve 58 by key 140 is urged to its lower position by spring 142 in order to bring the clutch and brake member into braking engagement with stationary housing member 86 through the medium of the friction facing 144. Engagement of clutch and brake member 138 with housing 86 will serve to hold the tub structure stationary.

When the rollers 132 are at the upper end of the cam rises drive member 134 will be lifted so as to engage clutch and brake member 138 frictionally through the medium of the friction facing at 146, and by this engagement the clutch and brake member 138 will be lifted away from housing member 86 and be drivingly connected with drive member 134.

It will thus be seen that in one direction of rotation of drive ring 124, the said drive ring, the cam ring 128, and drive member 134 will rotate freely about drive sleeve 58, while the tub structure will be stationarily braked; whereas, in the opposite direction of rotation of drive ring 124 the drive ring, cam ring 128, and drive member 134 will be drivingly engaged with clutch and brake member 138 thereby to drive the tub structure in rotation.

The same direction of rotation of the drive ring 124 that drives the tub in rotation will also clutch the agitator to the tub so that the tub and agitator will rotate in unison; whereas, in the opposite direction of rotation of the drive ring, the agitator will oscillate while the tub will be held against rotation. The opposite directions of rotation of drive ring 124 and gear 100 are accomplished, according to this invention, by reversing drive motor 26.

Figure 6:
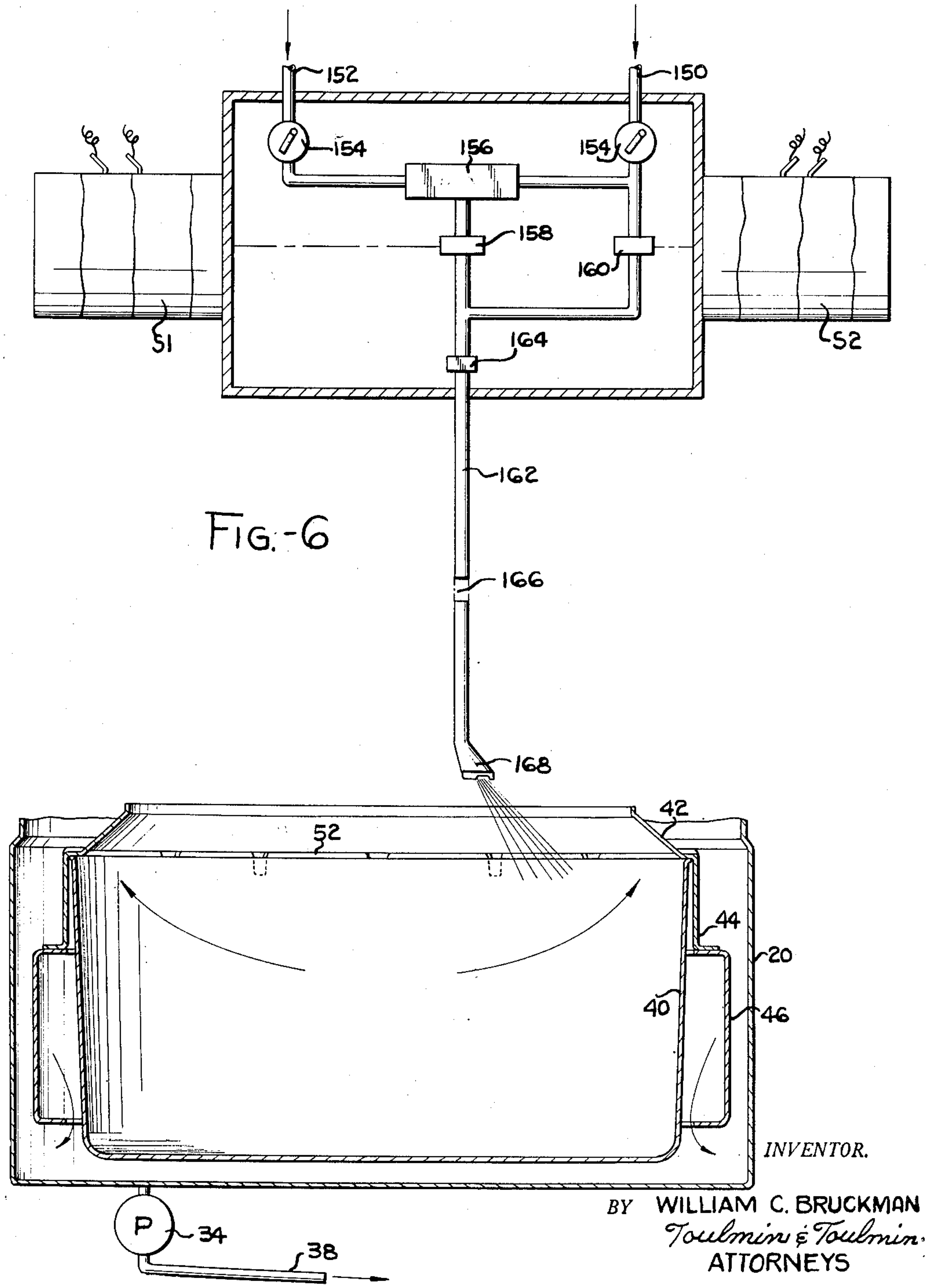
Figure 6 is a more or less diagrammatic view showing the hydraulic system for the machine, by means of which water is supplied to the tub for washing and rinsing cycles, and also showing the connection of the sump pump which removes the discharged water from the sump surrounding the tub.

Turning now to Figure 6, there is shown the hydraulic system, by means of which the tub is periodically filled with water during a cycle of operations. In Figure 6 the hot water inlet pipe is illustrated at 150 and the cold water inlet pipe at 152. These pipes each include a check valve 154 that will prevent backward flow therein, and each pipe leads to a thermostatically operated mixing valve 156, the discharge side of which leads to a normally closed valve 158.

The hot water inlet pipe 150 also includes a branch bypassing mixture valve 156 and shutoff valve 158, and which branch includes a normally closed shutoff valve 160.

A conduit 162 leading to the tub includes a flow control member 164 which provides for substantially constant rate of flow through conduit 162 within the normal range of pressure variation that will be encountered in water systems.

Conduit 162 also includes an air gap 166 which will prevent siphoning of water from the tub and contamination of the supply lines.

Valve 158 has an operating solenoid S–1 energizable for opening the valve, while valve 160 has an operating solenoid S–2 also energizable for opening the valve.

The discharge end of conduit 162 comprises a spray nozzle 168 which is illustrated in perspective in Figure 5. Spray nozzle 168 consists of a deflector member 170 positioned over the discharge opening of spray nozzle 168, and which deflector member has the dependent side walls 172 with an opening 174 at the front of the spray nozzle. The underside surface of deflector member 170 is curved downwardly as at 176 so that, when water under pressure is supplied through conduit 162 to the spray nozzle, it will be issued therefrom in the form of a relatively broad substantially flat spray directed toward the side of the tub. In this manner, at the beginning of a spin cycle, when the tub is commencing to rotate and the water therein is moving outwardly and spilling through the openings 52 where the tub joins the crown ring, any scum or soap film or suds on top of the water will be skimmed therefrom by the spray nozzle, thus preventing the scum or suds from being deposited on the clothes within the tub.

Figures 8, 9:
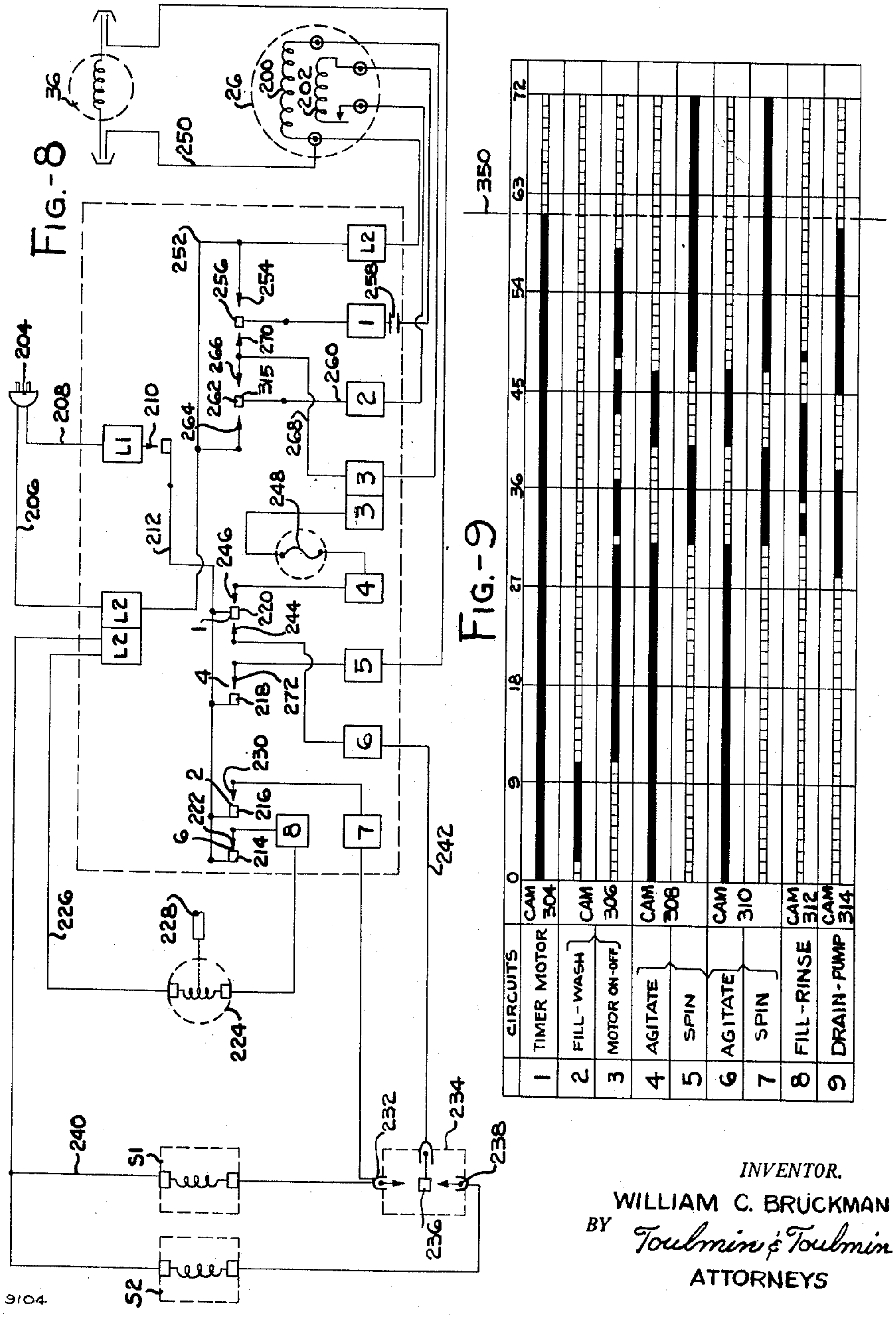
Figure 8 is a more or less diagrammatic representation of the electric circuit for operation of the machine of this invention, and which circuit is controlled by the timer mechanism of Figure 7.
Figure 9 is an energization chart showing periods of energization of the several circuits of Figure 8, and which are controlled by the timer mechanism of Figure 7.

Turning now to Figure 8, this view illustrates the electric circuit for controlling the machine. In Figure 8 the drive motor 26 will be seen to comprise a running winding 200 and a starting winding 202 which can be reversed relatively for obtaining operation of the motor in both directions.

The electric circuit is adapted for being energized from a plug 204 which is connected with the wires 206 and 208, one of which leads through a line switch 210. The side of line switch 210, opposite its connection to wire 208, is connected by a wire 212 to a plurality of contacts identified at 214, 216, 218 and 220. Associated with contact 214 is a contact 222 leading to one side of a timer motor 224, the other side of which is connected by wire 226 with wire 206. Timer motor 224 is adapted for driving a shaft 228 at a constant rate of rotation, preferably through a ratchet mechanism, that will produce periodic indexing movements of the said shaft.

Contact 216 is associated with a contact 230 leading to terminal 232 of a selector switch 234 that is mounted in panel 16, and which switch is adapted for closing a contact 236 on terminal 232 or for closing the said contact on a second terminal 238.

Terminal 232 is connected with one end of solenoid S–1 previously referred to as being located in the discharge line from temperature regulating valve 156, and the other side of solenoid S–1 is connected by wire 240 with wire 206.

Terminal 238 of the selector switch is connected with one end of solenoid S–2 located in hot water pipe 150, with the other side of solenoid S–2 being connected by wire 240 with wire 206.

Contact 236 of selector switch 234 is connected by wire 242 with contact element 244 that is associated with contact element 220.

Contact element 220 also has associated therewith another contact element 246 which is connected through a fuse 248, with one end of running winding 200 of motor 26.

The other end of running winding 200 is connected by wire 250 with one side of sump pump motor 36, and by wire 252 with wire 206, and also with a contact element 254. Contact element 254 has associated therewith a contact element 256 that is connected through a condenser 258, with one end of starting winding 202 of motor 26. The other end of starting winding 202 is connected by a wire 260 with a contact element 262 having associated therewith one contact element 264 that is connected with wire 206, and a second contact element 266 that is connected by a wire 268 with the end of running winding 200 of motor 26 that leads to contact element 246. Wire 268 is also connected with a contact element 270 associated with previously referred to contact element 256.

Contact element 218 is associated with contact element 272 leading to the side of sump pump motor 36 opposite its connection with wire 250.

Figure 7:
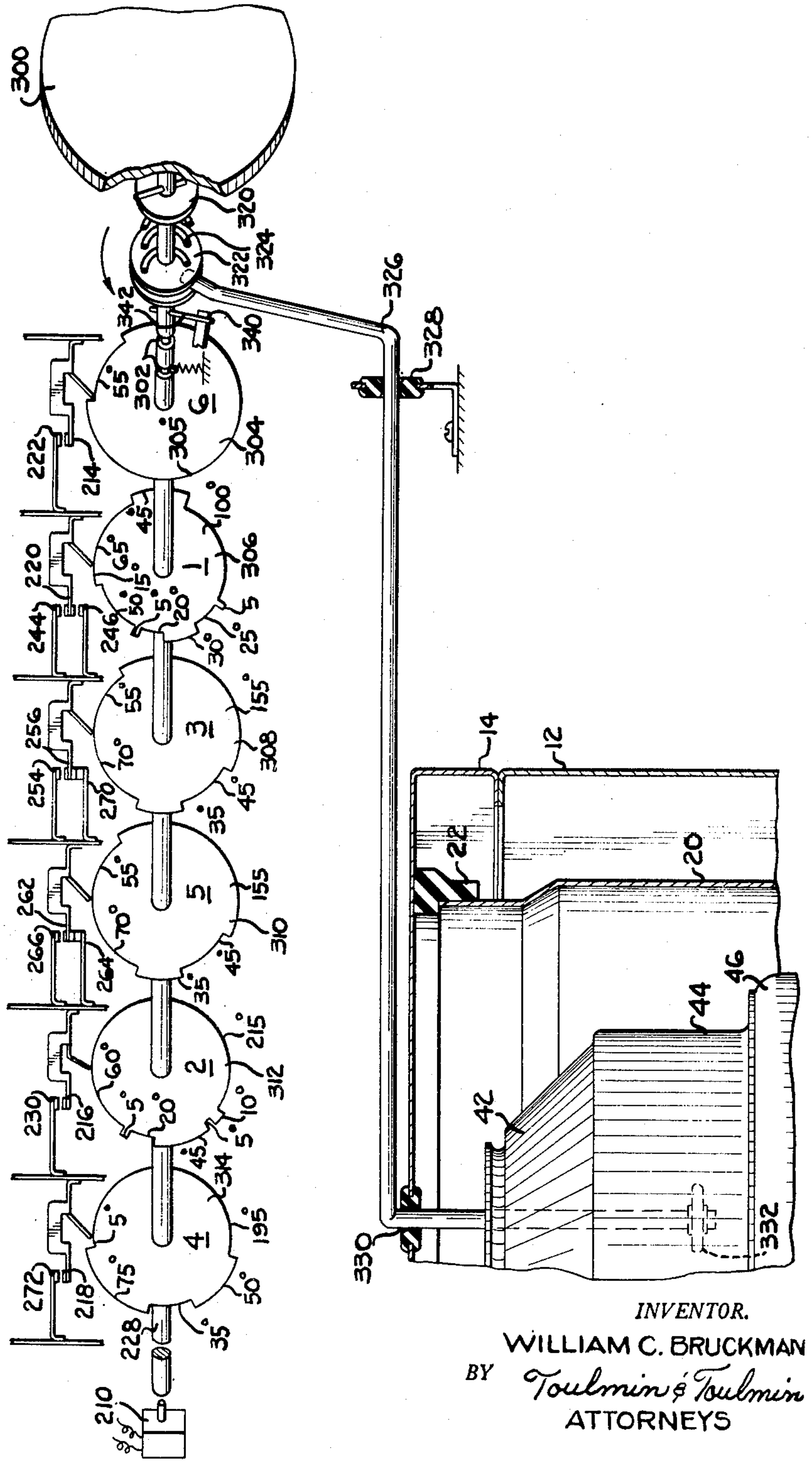
Figure 7 is a more or less diagrammatic view showing the timer control according to this invention and the throw-out switch which halts the operation of the machine when the tilting of the tub structure, due to unbalanced loads therein, becomes excessive.

The several contact elements referred to above are illustrated in operative relation in Figure 7, together with a plurality of control cams mounted on shaft 228 that is driven by timer motor 224, and which cams control the opening and closing elements.

In Figure 7 it will be seen that the line switch 210, which is normally open, is arranged with its operating element aligned with shaft 228. Shaft 228 has, at its opposite end, a manual control knob 300, by means of which the said shaft can be pushed inwardly thereby to close line switch 210 to initiate the cycle of operations of the machine. The detent means at 302 provide means for retaining the shaft 228 in its two axially spaced positions.

Mounted on shaft 228 is a plurality of cams for contact elements which were described in Figure 8 and which bear the same reference numerals as in Figure 7.

From right to left, in Figure 7, contact element 214, which has associated therewith contact element 222, is controlled by a cam 304. Cam 304 engages an operating finger on contact element 214, and during 55° of rotation of cam 304 contact element 214 is spaced from contact element 222; whereas, during the remaining 305° of cam 304, the contact elements are closed. This cam and the contact elements associated therewith control the energization of timer 224.

The next cam 306 controls the filling of the tub with water and the energization of drive motor 26. The cam controls contact element 220 which can be closed on contact element 244 over a high part of the cam, or closed on contact element 246 over a low part of the cam, or held in a neutral position as is illustrated in Figure 7. Cam 306, reading clockwise about the cam from the point at which it engages the finger of contact element 220 consists of 65° at an intermediate level which holds the contact element 220 neutral, then 45° at an upper level which holds contact element 220 against element 244, and then 100° of a lowered portion wherein contact element 220 engages contact element 246, then 5° of an intermediate portion where contact element 220 is again neutral, then 25° of a lowered portion, then 30° of an intermediate portion, then 20° of a lowered portion, then another 5° of an intermediate portion, then 50° of a lowered portion, and then finally 15° of an intermediate portion that joins with the 65° of the intermediate portion originally referred to.

The next cam on the shaft, 308, controls contact element 256. Commencing from the point of engagement of the cam with the operating finger of contact element 256, the hem comprises first 55° of a lowered portion where the contact element 256 engages contact element 270, then 155° of a raised portion where contact element 256 engages contact element 254, then 45° of a lowered portion, then 35° of a raised portion, and then finally 70° of a lowered portion which connects with the first-mentioned lowered portion of 55°.

The next cam 310 is identical with cam 308 and controls contact element 262 which is movable between contact elements 264 and 266. Cams 3 and 5 control the reversing of drive motor 26 and, while contact elements 256 and 262 are closed on contact elements 270 and 264 respectively, the motor 26 rotates in a direction for spinning the tub; whereas, when contact elements 256 and 262 are closed on contact elements 254 and 266 respectively, the agitator is oscillated while the tub is stationary.

The next cam 312 controls the filling of the tub during the rinse cycle and is associated with contact elements 216 and 230. Reading clockwise around cam 312 from the point of engagement thereof with the operating finger of contact element 216, the cam consists first of 215° of a lowered portion where the contact elements are open, then 10° of a raised portion where the contact elements are closed, then 5° of a lowered portion, then 45° of a raised portion, then 20° of a lowered portion, then 50° of a raised portion, and finally 60° of a lowered portion which joins with the first-mentioned 215° of a lowered portion.

The next cam 314 controls the operation of drain pump motor 36 and is associated with contact elements 218 and 272. Commencing from the point of engagement with the cam and the operating finger, and reading clockwise around the cam, the cam consists of 195° of a lowered portion where the contact elements are open, then 50° of a raised portion where they are closed, then 35° of a lowered portion, then 75° of a raised portion, and finally 5° of a lowered portion which joins with the first-mentioned 195° of a lowered portion.

At the right end of shaft 228, as it is viewed in Figure 7, there is pinned a washer 320 and slidably on the shaft behind the washer is a collar 322 with a compression spring 324 interposed between the collar and the washer. Collar 322 is annularly slotted and receives the end of a lever 326 pivotally supported at 328 and 330 and comprising a dependent portion extending alongside the dependent skirt 44 of the crown ring on top of the tub and carrying a roller 332. The described arrangement provides for movement of lever 326 by the tub when it exceeds a predetermined amount of tilt thereby to shift shaft 228 rightwardly away from line switch 210, thus permitting the line switch to open and to interrupt operation of the machine. At the same time the spring 324 will prevent shaft 228 from being only partly moved by lever 326 or from being moved instantaneously merely by a minor engagement of roller 322 by the tub.

The timing mechanism described includes the automatic halting of the operation of the machine after one complete cycle has been completed. This means comprises the inclined cam 340 adapted for engagement by a pin 342 carried by shaft 228. When the shaft 228 is positioned to initiate a cycle of operations pin 342 is beyond the end of cam 340, and shaft 228 can thus be moved inwardly to its operative position where it closes line switch 210 and initiates a cycle of operations. After shaft 228 has rotated substantially 304°, however, pin 342 will ride up cam 340, thus moving shaft 228 outwardly from opening line switch 210 and automatically stopping the washing machine.

In Figure 9 there is illustrated an energization chart in which the several circuits controlled by the contact elements are illustrated diagrammatically to indicate their periods of energization. In Figure 9 the various circuits are illustrated as being energized or closed by solid black lines, and where the circuits are de-energized or opened the lines are open.

Starting from the left, the circuit for the timer motor, which is controlled by cam 304, will be seen to be closed for 305° of cam rotation and open for 55°. The circuits controlled by cam 306 are those for filling the washer with water and the energization circuit for the drive motor 26. Starting from the left of Figure 9, it will be seen that the fill-wash circuit is open for the first 10° and then closed for the next 45°. At the instant the fill-wash circuit is de-energized the motor circuit is closed and remains closed for 100°, and then interrupted for a period of 5°. During this brief period of interruption of the motor circuit the switching necessary to accomplish the reversing thereof is done so that the reversing switches do not need to carry the full motor load current. The motor circuit is then closed for another 25° and is then open for a period of 30° during which the washer is filled with rinse water, is then closed for a period of 20° during which time the clothes are agitated during the rinsing cycle, is then opened for 5° during which time the connections to the motor are reversed to prepare it for spinning the tub, and the motor circuit is then again closed for a spin cycle and remains closed for 50° of cam rotation before again opening.

The next circuits illustrated are the reversing circuits for the motor which are controlled by cams 308 and 310. The upper circuit illustrated for each of the cams indicates the energization of the motor during an agitating cycle, and the lower circuit for each of the cams indicates the energization of the motor during a spin cycle.

It will be seen from the left side of Figure 9 that the motor circuit is conditioned for operation of the motor in a direction for driving the agitator during 155° of cam rotation, is then conditioned for the motor to run in a direction to spin the tub during 45° of cam rotation, then shifts back to the direction of rotation to operate the agitator during a rinsing operation for a period of 35° of cam rotation, and then conditions the motor circuit for a spinning operation for the remainder of the period of revolution of the cams.

Cam 312, which controls the filling of the tub during a rinsing operation, maintains the fill-rinse circuit open for 160° of cam rotation, then closes the circuit for 15° of cam rotation which provides for the skimming spray from the nozzle 168 previously referred to, is then open for 5°, is then closed for 45° of cam rotation to fill the tub with rinse water, is then open for 20° during which time the clothes are agitated within the tub and the tub commences to spin, is then open for another 5° during the initial part of the final spinning operation, and then remains open during the remainder of the cam revolution.

The circuit for the drain pump, which is controlled by cam 314, starting from the left side of Figure 9, is open for a period of 140° of cam rotation, is then closed for a period of 50° of cam rotation during which time the pump removes from the sump the water that is spun from the tub, is then open for a period of 35° during which time the washer goes through a rinse operation, is then again closed for a period of 75° during which time the washer goes through a spin dry operation at the end of a rinsing cycle. The drain pump circuit then remains open during the remainder of rotation of its cam.

The particular position of the cams, as illustrated in Figure 7, is indicated by the dot-dash line 350 for the right side of Figure 9. The cams in Figure 7 rotate counter-clockwise and will open and close the circuits controlled thereby, reading from left to right in Figure 9.

It will be noted, in connection with Figures 7, 8 and 9, that drive motor 26 is under the control, not only of cam 306, but also of cams 308 and 310. Cam 306 determines the periods during which the motor will be energized, whereas cams 308 and 310 determine the direction of rotation of the motor during its periods of energization. It will also be noted that the filling of the washer for a washing cycle is controlled by cam 306 so that the filling cycle takes place during a predetermined time period. This is possible because of the flow control characteristics of the filling valve which provides a substantially constant rate of flow into the washer within wide limits of pressure variation in the water supply lines, with about 20 pounds per square inch to about 100 pounds per square inch providing for substantially the same rate of flow. Because of this it is possible to eliminate float controlled valves and the like which are commonly employed in washing machines of this general type and, instead, to control the filling of the washer simply by timing the filling period.

From the foregoing it will be observed that a single integrated control system, consisting essentially of a single shaft driven by a timer motor and having a plurality of cams thereon and contact elements controlled thereby, effects the complete control of the washing machine through filling operations, spraying operations, and agitating and spin cycles. No float valves for controlling the water level are required, and no solenoid-operated clutches or the like are required for changing from agitator operation to spin operation. The net result is a compact inexpensive and relatively simple control system that can be produced at minimum cost and maintained at minimum cost.

In the electric circuit of Figure 8 the selector switch 234, which is also identified in Figure 1 as being mounted on panel 16, provides a ready selection between hot water and warm water. In one position of the selector switch 234 the thermostatic control valve 156 is by-passed so that hot water directly from the hot water line is supplied to the washer, whereas, when switch 234 is in its other position, the supply of water to the washer is by way of the thermostatic control valve, whereby water of uniform temperature is supplied to the washer.

It will be understood that this invention is susceptible to modification in order to adapt it to different usages and conditions, and, accordingly, it is desired to comprehend such modifications within this invention as may fall within the scope of the appended claims.

I claim:

1. In a washing machine; a rotatable tub, an oscillatable agitator, a drive motor connected with said tub and agitator rotatable in one direction to drive the tub in rotation and in the opposite direction to oscillate the agitator, a water supply conduit leading to said tub and having a valve therein controlled by an electro-mechanical device, and means responsive to elapsed time for controlling the supply of water through the conduit to the tub and for controlling the energization and the direction of rotation on said motor, said time responsive means comprising a timer unit having a plurality of switches directly controlling the energization and direction of rotation of said motor and directly controlling said electro-mechanical device.

2. In a washing machine; a tub rotatable during a spin dry cycle, an agitator in the tub oscillatable during a washing cycle, a water supply conduit leading to the tub, valve means in said conduit, electro-mechanical means for operating said valve, an electric drive motor connected with the tub and agitator rotatable in one direction for spinning the tub and in the opposite direction for oscillating the agitator, means responsive to elapsed time for controlling the said valve thereby to control the supply of water through said conduit to said tub and for controlling the energization in the direction of rotation of said motor, said time responsive means comprising a timer unit having a plurality of switches directly controlling the energization and direction of rotation of said motor and directly controlling said electro-mechanical device, and said conduit including means for maintaining a substantially constant rate of fluid flow therethrough.

3. In a washing machine; a tub rotatable during a spin cycle, an agitator in the tub oscillatable during washing and rinse cycles, a drive motor for said tub and agitator rotatable in one direction for spinning the tub and in the opposite direction for oscillating the agitator, a water supply conduit leading to said tub having a valve therein, hot and cold water lines leading to said valve, control means in the valve for mixing hot and cold water, flow control means in said conduit for maintaining substantially constant flow therethrough under widely varying pressure conditions, a solenoid operator for said valve, switches for directly controlling the energization of said solenoid and the energization of said motor and the direction of rotation of said motor, cams controlling all of said switches, and means for driving said cams for a complete cycle of operations of said washing machine.

4. In a washing machine; a tub rotatable for a spin dry cycle, an agitator within the tub oscillatable for washing and rinse cycles, a water supply conduit leading to said tub and including flow control means for maintaining constant flow therethrough under widely varying pressure conditions, hot and cold water supply lines and a valve connecting said water supply lines with said conduit, a solenoid for controlling said valve, control means in the valve for mixing hot and cold water, an electric drive motor connected with the tub and agitator rotatable in one direction for spinning the tub and in the opposite direction for oscillating the agitator, a first switch having one position where the valve solenoid is energized, a second position wherein an energizing circuit for the motor is established, and a third neutral position, other switch means for reversibly connecting said drive motor with its energizing circuit, cams for directly operating all of said switches, a timer-driven shaft supporting all of said cams, and said first switch being arranged to occupy its said third neutral position when the said other switch means for controlling the connection of said motor with its energizing circuit are actuated.

5. In a washing machine; a rotatable tub, an agitator in the tub, an electric motor rotatable in one direction to spin the tube for a spin dry cycle and in the opposite direction to oscillate the agitator for washing and rinsing cycles, a water supply conduit leading to the tub having a valve therein with hot and cold water inlets, a solenoid for opening said valve, control means in the valve for mixing hot and cold water, switches for directly controlling the energization of said solenoid and for directly controlling the energization of said motor and the direction of rotation thereof, cams for operating said switches, a timer driven shaft supporting all of said cams for driving the cams in rotation for a complete cycle of operations of said washing machine consisting of successive washing and rinsing cycles, each of which comprises the energization of said solenoid operation to fill the tub and the energization of said motor to first actuate the agitator and then spin said tub, a by-pass line from said hot water inlet around said valve to said conduit, and means selectively operable for accomplishing the filling of the tub through said by-pass line directly from the hot water inlet during said washing cycle.

6. In a washing machine; a tub rotatable for a spin dry cycle, an agitator in the tub oscillatable for washing and rinsing cycles, an electric drive motor for said tub and agitator rotatable in one direction for spinning the tub and in the opposite direction for oscillating the agitator, a water supply conduit leading to said tub and having a valve therein with hot and cold water inlets, a solenoid operator for said valve, control means in the valve for mixing hot and cold water, switches for directly controlling the energization of said solenoid and directly controlling the energization of said motor and the direction of rotation of said motor, cams for operating said switches, a shaft supporting said cams, and a timer for driving said shaft in rotation for a complete cycle of operations of said washing machine consisting of successive washing and rinsing cycles, each of which comprises the energization of said solenoid operator to fill the tub, the energization of said motor to actuate the agitator, and then the energization of said motor to spin said tub.

7. In a washing machine; a tub rotatable for a spin dry cycle, an agitator in the tub oscillatable for washing and rinsing cycles, an electric drive motor for said tub and agitator rotatable in one direction for spinning the tub and in the opposite direction for oscillating the agitator, a water supply conduit leading to said tub having a thermostatically controlled valve therein with hot and cold water inlets, a solenoid operator for said valve, switches for directly controlling the energization of said solenoid and for directly controlling the energization of said motor and the direction of rotation of said motor, cams for controlling said switches, a shaft supporting said cams, and a timer for driving said shaft in rotation for a complete cycle of operations of said washing machine consisting of successive washing and rinsing cycles, each of which comprises the energization of said solenoid operator to fill the tub, the energization of said motor to actuate the agitation, and then the energization of said motor to spin said tub, other switch means for controlling said solenoid operator, a cam on said shaft controlling said other switch means, and said cam being operable to close the switch means to energize said solenoid operator for a time interval at the beginning of each spin dry cycle.

8. In a washing machine; a rotatable tub, an oscillatable agitator in the tub, an electric drive motor connected with the tub and agitator rotatable in one direction for spinning the tub and agitator for a spin dry cycle and in the opposite direction for oscillating the agitator in the tub, a water supply conduit leading to said tub having a discharge nozzle for spraying water into the tub and also having a thermostatically controlled valve with hot and cold water inlets, a solenoid operator for said valve, a first switch having a neutral position and being movable therefrom directly to energize said solenoid operator or directly to establish an energizing circuit for said motor, second switch means for directly reversibly connecting said motor with said energizing circuit, third switch means also connected for directly energizing said solenoid operator, cams for operating said switches, a common shaft supporting said cams, and a timer for driving said shaft in rotation for a complete operative cycle of said washing machine consisting of successive washing and rinsing cycles, each of which comprises the energization of said solenoid operator to fill the tub, the energization of said motor to actuate the said agitator, and then the energization of said motor to spin said tub, said first switch controlling the solenoid operator during a washing cycle, and said third switch means controlling the energization of said solenoid operator during a rinsing cycle.

9. In a washing machine; a rotatable tub, an oscillatable agitator in the tub, an electric drive motor connected with the tub and agitator rotatable in one direction for spinning the tub and agitator for a spin dry cycle and in the opposite direction for oscillating the agitator in the tub, a water supply conduit leading to said tub having a discharge nozzle for spraying water into the tub and also having a thermostatically controlled valve with hot and cold water inlets, a solenoid operator for said valve, a first switch having a neutral position and being movable therefrom directly to energize said solenoid operator or directly to establish an energizing circuit for said motor, second switch means for reversibly directly connecting said motor with said energizing circuit, third switch means also connected for directly energizing said solenoid operation, cams for said switches, a shaft supporting said cams, a timer for driving said shaft in rotation for a complete operative cycle of said washing machine consisting of successive washing and rinsing cycles, each of which comprises the energization of said solenoid operator to fill the tub, the energization of said motor to actuate the said agitator, and then the energization of said motor to spin said tub, said first switch controlling the solenoid operator during a washing cycle, and said third switch means controlling the energization of said solenoid operator during a rinsing cycle, said third switch means also providing for an interval at the beginning of each spin cycle of the tub when the solenoid operator is energized for spraying water into the tub to wash suds or other floating matter off the water in the tub.

10. In a washing machine; a rotatable tub, an oscillatable agitator therein, a drive motor rotatable in one direction to spin said tub and in the opposite direction to drive said agitator, a water supply conduit leading to said tub and having a valve therein, switches for controlling said valve and the energization and direction of rotation of said motor, cams for controlling said switches, a shaft supporting said cams rotatable to drive the cams to control the switches for an operative cycle of said washer, a line switch adapted for being opened by axial movement of said shaft to interrupt the supply of energy to said washing machine, said tub having at least a portion movable laterally during rotation thereof to counterbalance the tub, and means associated with said shaft positioned to be engaged by said portion of said tub on lateral movement thereof beyond a predetermined amount for moving said shaft to open said line switch.

11. In a washing machine; a frame, a tub rotatable in the frame during a spin dry cycle and being movable transversely of its axis within the frame in order to counterbalance unbalanced loads within the tub, a drive motor connected with the tub, an energizing circuit for said motor, a switch controlling said energizing circuit, a cam controlling said switch, a timer driven shaft supporting said cam, a line switch in series with said first-mentioned switch adapted for being opened by axial movement of said shaft, an arm mounted in said frame having means at one end for engagement by said tub upon a predetermined transverse movement thereof, and means between the other end of said arm and said shaft for moving said shaft in a direction to open said line switch upon said movement of said tub beyond a predetermined limit during rotation thereof.

12. In a washing machine; a tub, an agitator in the tub, a drive motor connected with the tub and agitator, a water supply conduit leading to said tub and having a valve therein, a solenoid operator for said valve, a switch for directly controlling said solenoid operator and for directly establishing the energizing circuit for said motor, other switch means for reversibly directly connecting said motor with said energizing circuit, rotatable cams controlling said switches and including means for actuating the first switch to open said energizing circuit during the period that said second switch means is actuated, and means responsive to the direction of rotation of said motor for selectively connecting it with said agitator to oscillate the agitator and for connecting it with said tub and agitator to spin the tub and agitator.

13. In a washing machine; a rotatable tub, an agitator in the tub, an electric motor connected with the tub and agitator operable for spinning the tub and for oscillating the agitator, a water supply line leading to said tub, means including a timer unit having switch for controlling the flow of water through said conduit to fill the tub, switch means in said timer unit for energizing said motor first for actuating said agitator and then for spinning said tub, said tub having at least a portion movable transversely of the axis thereof for effecting the counterbalancing thereof during the spinning of the tub, and means including switch means in said timer unit responsive to a predetermined amount of lateral movement of said portion for interrupting the operation of said washing machine.

14. In a washing machine; a rotatable tub, an oscillatable agitator therein, a drive motor energizable for spinning said tub or for oscillating said agitator, a water supply conduit leading to said tub and having a valve therein, switches for controlling said valve and the energization of said motor, cams for controlling said switches, a shaft supporting said cams rotatable to drive the cams to control the switches for an operable cycle of said washing machine consisting of first filling the tub with water, then energizing the motor for oscillating the agitator, and then for spinning the tub, a line switch adapted for being opened by axial movement of said shaft to interrupt the supply of energy to said washing machine, said tub having at least a portion movable transversely of the axis of said tub during rotation of the tub to counterbalance unbalanced loads within the tub, and means associated with said shaft positioned to be engaged by the said portion of said tub upon lateral movement of the said portion beyond a predetermined amount for moving said shaft to open said line switch.

References Cited in the file of this patent

UNITED STATES PATENTS

| | | |
|---|---|---|
| 2,161,604 | Watts | June 6, 1939 |
| 2,331,897 | Dyer | Oct. 19, 1943 |
| 2,350,108 | Geldhof et al. | May 30, 1944 |
| 2,453,409 | Chace | Nov. 9, 1948 |
| 2,520,695 | Sisson | Aug. 29, 1950 |
| 2,526,444 | Woodson | Oct. 17, 1950 |
| 2,635,446 | Smith | Apr. 21, 1953 |